US007965273B2

(12) United States Patent
Lee et al.

(10) Patent No.: US 7,965,273 B2
(45) Date of Patent: Jun. 21, 2011

(54) BUFFER AND ORGANIC LIGHT EMITTING DISPLAY USING THE BUFFER

(75) Inventors: Wang-jo Lee, Suwon-si (KR); Do-youb Kim, Suwon-si (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 928 days.

(21) Appl. No.: 11/905,971

(22) Filed: Oct. 5, 2007

(65) Prior Publication Data

US 2008/0170059 A1 Jul. 17, 2008

(30) Foreign Application Priority Data

Jan. 17, 2007 (KR) ........................ 10-2007-0005320

(51) Int. Cl.
*G09G 3/36* (2006.01)
*G09G 5/00* (2006.01)
*G06F 3/038* (2006.01)

(52) U.S. Cl. ..................... 345/98; 345/204; 257/E27.11

(58) Field of Classification Search .................... 345/76, 345/77, 80, 82, 83, 98, 100, 204, 545, 546, 345/566; 365/189.05, 230.08; 257/E27.11
See application file for complete search history.

(56) References Cited

U.S. PATENT DOCUMENTS 4,558,234 A * 12/1985 Suzuki et al. ................. 326/110
7,307,455 B2 * 12/2007 Choi et al. ...................... 326/82
7,639,217 B2 * 12/2009 Shin ................................ 345/76
7,804,475 B2 * 9/2010 Chen et al. .................... 345/100
2005/0259490 A1 * 11/2005 Eom ............................ 365/221

FOREIGN PATENT DOCUMENTS

KR 10-2003-0076775 9/2003
KR 10-0629577 9/2008

OTHER PUBLICATIONS

Suriyaammaranon, Chatpong; Dejhan, Kobchai; Cheevasuvit, Fusak; A High Speed BiCMOS Tristate Buffer Circuit: Falculty of Engineering and Research Center for Communication and Information Technology; King Mongkut's Institute of Technology Ladkrabang; pp. 197-199. 1999.*

Fang, Sung-Chuan; Wang, Jyh-Ming; Feng, We-Shiung; A New Direct Design for Three-Input XOR Function on the Tansistor Level: IEEE Transactions on Circuits and Systems-I: Fundamental Theory and Applications, vol. 43, No. 4, Apr. 1996.*

* cited by examiner

*Primary Examiner* — Richard Hjerpe
*Assistant Examiner* — Alecia D English
(74) *Attorney, Agent, or Firm* — Robert E. Bushnell, Esq.

(57) ABSTRACT

The present invention provides a buffer and an organic light emitting display that employs the buffer. The buffer is installed in a scan driver or a data driver, which generates scan signals and data signals, respectively, to drive the organic light emitting display. The buffer of the present invention is configured of p-channel metal-oxide-semiconductor (PMOS) transistors, and therefore the scan driver or data driver that includes the buffer can be mounted on a display panel. Various arrangements of the PMOS transistors are proposed for the buffer of the present invention. The buffer of the present invention effectively prevents leakage current that could be generated in the circuit of the buffer.

16 Claims, 4 Drawing Sheets

BUFFER AND ORGANIC LIGHT EMITTING DISPLAY USING THE BUFFER

CLAIM OF PRIORITY

This application makes reference to, incorporates the same herein, and claims all benefits accruing under 35 U.S.C. §119 from an application for BUFFER AND ORGANIC LIGHT EMITTING DISPLAY USING THE BUFFER earlier filed in the Korean Intellectual Property Office on the 17 of Jan. 2007 and there duly assigned Serial No. 10-2007-0005320.

BACKGROUND OF THE INVENTION

1. Field of the Invention

The present invention relates to a buffer and an organic light emitting display using the buffer, and more particularly to a buffer and an organic light emitting display using the buffer, which is configured of p-channel metal-oxide-semiconductor (PMOS) transistors to be capable of preventing leakage current.

2. Description of the Related Art

Recently, various flat panel display devices capable of reducing weight and volume, overcoming the disadvantages of a cathode ray tube, have been developed. Among the flat panel display devices, there are liquid crystal displays, field emission displays, plasma display panels, and organic light emitting displays.

The organic light emitting display displays an image through an organic light emitting diode (OLED) that generates light by re-coupling electrons and holes. The organic light emitting display is advantageous in having rapid response speed as well as low power consumption.

The organic light emitting display includes a plurality of pixels arranged in a two-dimensional array, a data driver for supplying data signals to data lines connected to the pixels, and a scan driver for supplying scan signals to scan lines connected to the pixels.

The data driver allows a predetermined image to be displayed on the pixels by supplying data signals that have information of data in every time period. The scan driver selects pixels, on which the data signals are to be supplied, by sequentially supplying scan signals in every time period.

As the panel size of the organic light emitting display becomes large, the data driver and/or the scan driver should be mounted on the panel in order to reduce size, weight, and manufacturing costs of the organic light emitting display. The buffer installed in a contemporary data driver and/or scan driver, however, is configured of both of p-channel metal-oxide-semiconductor (PMOS) transistors and n-channel metal-oxide-semiconductor (NMOS) transistors. Therefore, it is difficult to mount two different types of semiconductors on the panel, because PMOS and NMOS transistors cannot be manufactured at the same time. Accordingly additional manufacturing processes are necessary and manufacturing cost increases.

FIG. 1 is a diagram showing a buffer that can be installed in a contemporary data driver and/or scan driver. Referring to FIG. 1, the buffer includes first transistor M1 and third transistor M3 connected between first power source VDD and second power source VSS, and second transistor M2 and forth transistor M4 connected between first power source VDD and second power source VSS. The voltage of first power source VDD is set to be higher than the voltage of second power source VSS.

Gate electrodes of first transistor M1 and third transistor M3 are connected to input terminal IN. And, a first electrode of first transistor M1 is connected to first power source VDD, and a first electrode of third transistor M3 is connected to second power source VSS. A second electrode of first transistor M1 and a second electrode of third transistor M3 are connected to gate electrodes of second transistor M2 and fourth transistor M4. Herein, each of a first electrode and a second electrode of a transistor can be a source electrode or a drain electrode. For example, if a first electrode of a transistor is a source electrode, then a second electrode of the transistor is a drain electrode. Alternatively, a first electrode can be a drain electrode and a second electrode can be a source electrode.

The first electrode of second transistor M2 is connected to first power source VDD, and the first electrode of fourth transistor M4 is connected to second power source VSS. The second electrode of second transistor M2 and the second electrode of fourth transistor M4 are connected to output terminal OUT.

Describing operation processes, two types of signals (a low signal and a high signal) can be applied to input terminal IN. A low signal turns on transistors M1 and M2. Transistors M3 and M4 are different type from transistor M1 and M2, and a high signal turns on transistors M3 and M4. If a low signal is inputted to input terminal IN, first transistor M1 is turned on. If first transistor M1 is turned on, voltage of first power source VDD, which is a high signal, is supplied to both of the gate electrodes of second transistor M2 and fourth transistor M4. Therefore, fourth transistor M4 is turned on. Then, the voltage of second power source VSS is outputted through output terminal OUT. In other words, when a low signal is inputted to input terminal IN, the voltage of second power source VSS is outputted through output terminal OUT.

If a high signal is inputted to input terminal IN, third transistor M3 is turned on. If third transistor M3 is turned on, voltage of second power source VSS, which is a low signal, is supplied to both of the gate electrodes of second transistor M2 and fourth transistor M4. Therefore second transistor M2 is turned on. Then, the voltage of first power source VDD is outputted through output terminal OUT. In other words, if a high signal is inputted to input terminal IN, the voltage of first power source VDD is outputted through output terminal OUT.

However, this buffer is configured of NMOS transistors M3 and M4, and PMOS transistors M1 and M2, and therefore it is difficult to mount both of NMOS and PMOS transistors on a display panel.

SUMMARY OF THE INVENTION

Therefore, the object of the present invention is to provide a buffer, which can be mounted on a display panel, and to provide an organic light emitting display using the buffer. The present invention provides a buffer that is configured of PMOS transistors, and provides various arrangements of the PMOS transistors to improve the performance of the buffer. The buffer of the present invention is capable of preventing leakage currents.

In order to accomplish the above object, there is provided a buffer including a first power source for supplying voltage, a second power source supplying lower voltage than the first power source, a first input terminal for supplying a voltage signal, a second input terminal for supplying a voltage signal, an input unit connected to each of the first power source, the second power source, the first input terminal, and the second input terminal, and an output unit connected to each of the first power source, the second power source, and the first output terminal.

The input unit includes a first output terminal for outputting voltage, a seventh transistor, a fifth transistor, a sixth transistor, and an eighth transistor. A first electrode of the seventh transistor is connected to the first power source, a second electrode of the seventh transistor is connected to the first output terminal, and a gate electrode of the seventh transistor is connected to the first input terminal. A first electrode of the fifth transistor is connected to the first output terminal, and a second electrode of the fifth transistor is connected to the second power source. A first electrode of the sixth transistor is connected to a gate electrode of the fifth transistor, a second electrode of the sixth transistor is connected to the second power source, and a gate electrode of the sixth transistor is connected to the second input terminal. A gate electrode of the eighth transistor is connected to the first input terminal, and the eighth transistor is coupled to the fifth transistor.

The output unit includes a second output terminal. The second output terminal outputs voltage of the first power source or voltage of the second power source.

Polarity of voltage of the first input terminal may be opposite to polarity of voltage of the second input terminal.

The first electrode of the eighth transistor can be connected to the gate electrode of the fifth transistor, and the second electrode of the eighth transistor can be connected to the second input terminal. Alternatively, the first electrode of the eighth transistor can be connected to the gate electrode of the fifth transistor, and the second electrode of the eighth transistor can be connected to the first power source.

The eighth transistor supplies a voltage to the gate electrode of the fifth transistor to turn off the fifth transistor whenever voltage of the first power source is supplied to the first output terminal.

The input unit may includes a second capacitor connected between the first electrode of the fifth transistor and the gate electrode of the fifth transistor.

The output unit may include a first transistor, a second transistor, a third transistor, and a fourth transistor. A first electrode of the first transistor is connected to the first power source, a second electrode of the first transistor is connected to the second output terminal, and a gate electrode of the first transistor is connected to the first output terminal. A first electrode of the second transistor is connected to the second output terminal, and a second electrode of the second transistor is connected to the second power source. A first electrode of the third transistor is connected to the first electrode of the second transistor, a second electrode of the third transistor is connected to a gate electrode of the second transistor, and a gate electrode of the third transistor is connected to the first output terminal. A first electrode of the fourth transistor is connected the gate electrode of the second transistor, a second electrode of the fourth transistor is connected to the second power source, and a gate electrode of the fourth transistor is connected to the first input terminal.

The output unit may include a first capacitor connected between the first electrode of the second transistor and the gate electrode of the second transistor.

Each of the first, second, third, fourth, fifth, sixth, seventh, and eighth transistors may include a p-channel metal-oxide-semiconductor.

According to the embodiment of the present invention, there is an organic light emitting display including a light emitting diode for generating light where the light emitting diode is connected to each of a scan line and a data line, a scan driver connected to the scan line where the scan driver supplies a scan signal to the scan line, a data driver connected to the data line where the data driver supplies a data signal to the data line, and a buffer included in the scan driver or in the data driver.

The buffer includes a first power source for supplying voltage, a second power source supplying lower voltage than the first power source, a first input terminal for supplying a voltage signal, a second input terminal for supplying a voltage signal, an input unit connected to each of the first power source, the second power source, the first input terminal, and the second input terminal, and an output unit connected to each of the first power source, the second power source, and the first output terminal.

The input unit includes a first output terminal for outputting voltage, a seventh transistor, a fifth transistor, a sixth transistor, and an eighth transistor. A first electrode of the seventh transistor is connected to the first power source, a second electrode of the seventh transistor is connected to the first output terminal, and a gate electrode of the seventh transistor is connected to the first input terminal. A first electrode of the fifth transistor is connected to the first output terminal, and a second electrode of the fifth transistor is connected to the second power source. A first electrode of the sixth transistor is connected to a gate electrode of the fifth transistor, a second electrode of the sixth transistor is connected to the second power source, and a gate electrode of the sixth transistor is connected to the second input terminal. A gate electrode of the eighth transistor is connected to the first input terminal, and the eighth transistor is coupled to the fifth transistor.

The output unit includes a second output terminal. The second output terminal outputs voltage of the first power source or voltage of the second power source.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, preferred embodiments of the present invention, wherein a person having ordinary skill in the art can easily carry out the present invention, will be described in a more detailed manner with reference to the accompanying FIGS. 2 to 6.

Figure 1:
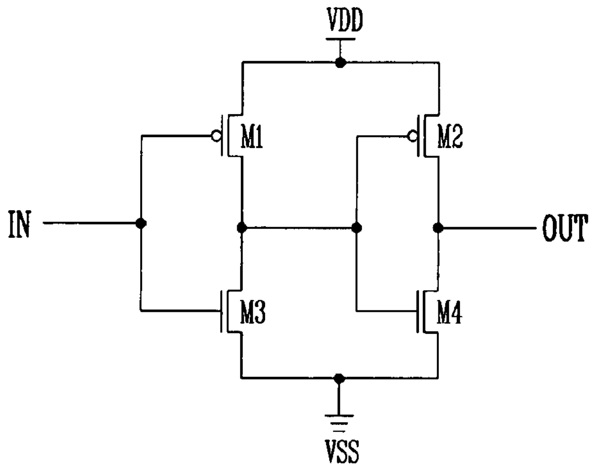
FIG. 1 is a circuit diagram showing a buffer.
Figure 2:
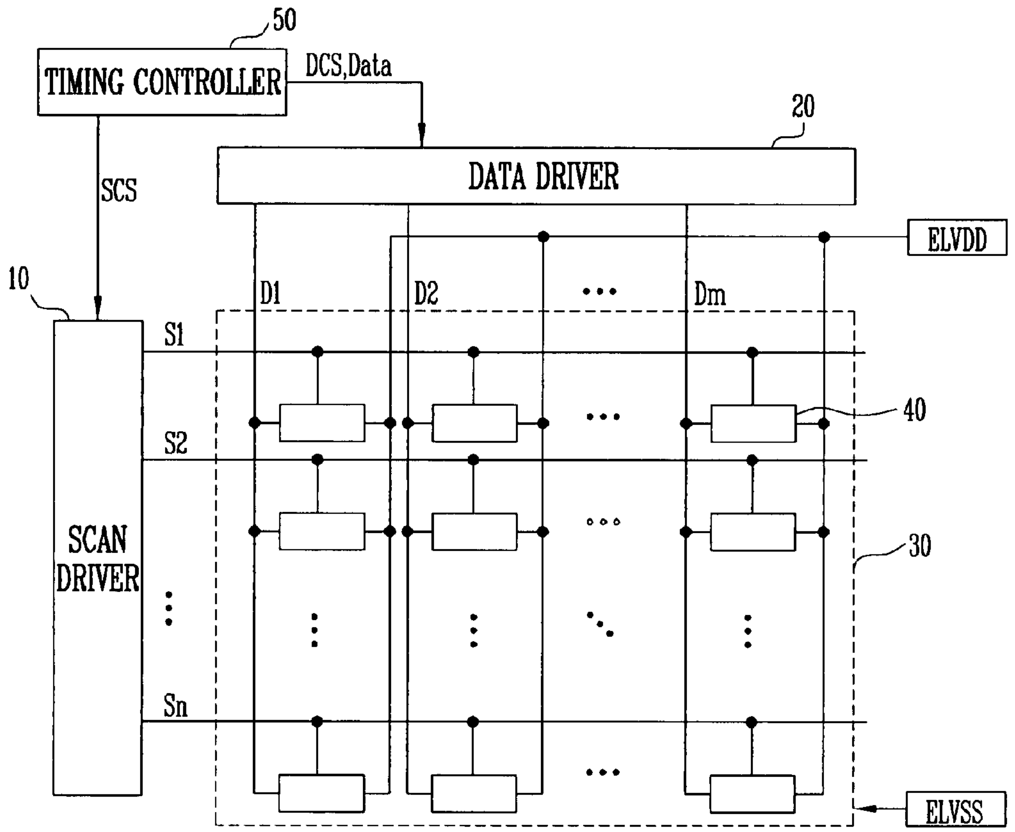
FIG. 2 is a diagram showing an organic light emitting display constructed as an embodiment of the present invention.

FIG. 2 is a diagram showing an organic light emitting display constructed as an embodiment of the present invention. Referring to FIG. 2, the organic light emitting display of the embodiment of the present invention includes pixel unit 30 that includes a plurality of pixels 40 connected between scan lines S1 to Sn and data lines D1 to Dm, scan driver 10 for supplying scan signals to scan lines S1 to Sn, data driver 20 for supplying data signals to data lines D1 to Dm, and timing controller 50 for controlling scan driver 10 and data driver 20. Each of pixels 40 includes an organic light emitting diode (OLED) that generates visible light.

Timing controller 50 generates data driving control signals DCS and scan driving control signals SCS by synchronizing signals supplied from an external circuit. Data driving control signals DCS generated from timing controller 50 are supplied to data driver 20, and scan driving control signals SCS generated from timing controller 50 are supplied to scan driver 10. And, timing controller 50 also supplies data Data supplied from the external circuit to timing controller 50.

Scan driver 10 is supplied with scan driving control signals SCS from timing controller 50. Scan driver 10 supplied with scan driving control signals SCS generates scan signals, and sequentially supplies the generated scan signals to scan lines S1 to Sn.

Data driver 20 is supplied with data driving control signals DCS from timing controller 50. Data driver 20 supplied with data driving control signals DCS generates data signals, and supplies the generated data signals to data lines D1 to Dm. The data signals are synchronized with the scan signals.

Pixel unit 30 is connected to first display power source ELVDD and second display power source ELVSS to supply power to each of pixels 40. Each pixel, at which power is supplied from first display power source ELVDD and second display power source ELVSS, controls current flowing from first display power source ELVDD to the second display power source ELVSS through an organic light emitting diode, in response to the data signals. The organic emitting diode generates light according to the data signals.

The buffer, constructed as an embodiment of the present invention, is included in scan driver 10 or data driver 20.

Figure 3:
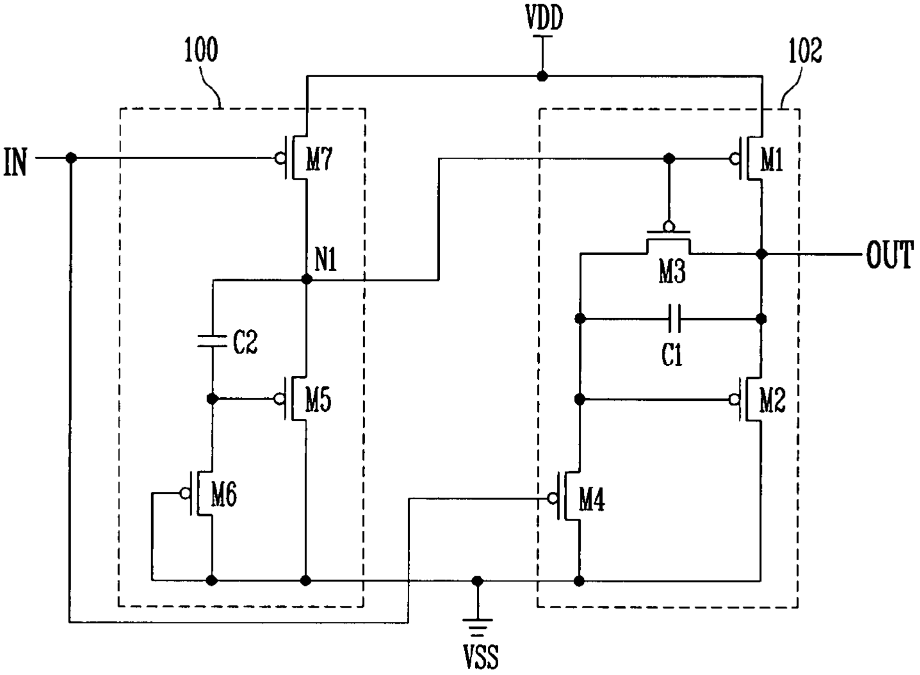
FIG. 3 is a circuit diagram showing a first embodiment of the buffer constructed as an embodiment of the present invention.

FIG. 3 is a diagram showing a buffer constructed as a first embodiment of the present invention. Referring to FIG. 3, the buffer of the first embodiment of the present invention includes input unit 100 and output unit 102. Transistors M1 to M4 are included in output unit 102, and transistors M5 to M7 are included in input unit 100. Each of transistors M1 to M7 can be a p-channel metal-oxide-semiconductor (PMOS) transistor.

Output unit 102 outputs high or low voltage through second output terminal OUT. High voltage corresponds to voltage supplied from first power source VDD, and low voltage corresponds to voltage supplied from second power source VSS. Whether high or low voltage is outputted is controlled by an input voltage, which is inputted to input unit 100 through input terminal IN.

Output unit 102 includes first transistor M1, second transistor M2, third transistor M3, and fourth transistor M4. As known in the art, a transistor has three electrodes: a source electrode, a drain electrode, and a gate electrode. Hereafter, the source and drain electrodes are referred to a first and second electrodes, respectively, or vice versa. For example, if a first electrode of a transistor is a source electrode, then a second electrode of the transistor is a drain electrode. Alternatively, a first electrode can be a drain electrode and a second electrode can be a source electrode.

Transistor M1 is connected between first power source VDD and second output terminal OUT, which means that a first electrode of transistor M1 is connected to first power source VDD and a second electrode of transistor M1 is connected to second output terminal OUT. The same definition is applied to the term of "being connected between" in other transistors. Second transistor M2 is connected between second output terminal OUT and second power source VSS. Third transistor M3 is connected between a gate electrode and a first electrode of second transistor M2. First capacitor C1 is connected, in parallel to third transistor M3, between the gate electrode and the first electrode of second transistor M2. Fourth transistor M4 is connected between the gate electrode of second transistor M2 and second power source VSS.

The gate electrode of first transistor M1 is connected to first node N1 of input unit 100, and the first electrode of first transistor M1 is connected to first power source VDD. And, the second electrode of first transistor M1 is connected to second output terminal OUT. First transistor M1 controls the electrical connection between second output terminal OUT and first power source VDD, while being turned on or turned off by responding to the voltage supplied to first node N1 of input unit 100.

The gate electrode of second transistor M2 is connected to each of the first electrode of fourth transistor M4, one terminal of first capacitor C1, and the second electrode of third transistor M3. The first electrode of second transistor M2 is connected to second output terminal OUT, and the second electrode of second transistor M2 is connected to second power source VSS. Second transistor M2 controls the electrical connection between second output terminal OUT and second power source VSS, while being turned on or turned off by responding to the voltage applied to the gate electrode of second transistor M2.

First capacitor C1 is connected between the first electrode and the gate electrode of second transistor M2. First capacitor C1 stores charges induced by the voltage applied between the gate electrode and the first electrode of second transistor M2. First capacitor C1 can be removed if necessary.

The gate electrode of third transistor M3 is connected to first node N1 of input unit 100, and the first electrode of third transistor M3 is connected to the second electrode of first transistor M1. The second electrode of third transistor M3 is connected to the gate electrode of second transistor M2. Third transistor M3 controls the voltage supplied to the gate electrode of second transistor M2, while being turned on or turned off simultaneously with first transistor M1.

The gate electrode of fourth transistor M4 is connected to input terminal IN, and the first electrode of fourth transistor M4 is connected to the gate electrode of he second transistor M2. The second electrode of fourth transistor M4 is connected to second power source VSS. Fourth transistor M4 controls the voltage supplied to the gate electrode of second transistor M2, while being turned on or turned off by responding to the voltage supplied to the input terminal IN of fourth transistor M4.

Input unit 100 supplies high or low voltage to output unit 102 by responding to the voltage supplied to input terminal IN. Input unit 100 includes seventh transistor M7 connected between first power source VDD and input terminal IN, fifth transistor M5 connected between the second electrode of seventh transistor M7 and second power source VSS, and sixth transistor M6 connected between the gate electrode of fifth transistor M5 and second power source VSS. First node N1, which connects the second electrode of seventh transistor M7 to the first electrode of fifth transistor M5, is used as an output terminal of input unit 100. Therefore, first node N1 can be referred to as a first output terminal of input nit 100.

The first electrode of fifth transistor M5 is connected to first node (first output terminal) N1, and the second electrode of fifth transistor M5 is connected to second power source VSS. The gate electrode of fifth transistor M5 is connected to one terminal of second capacitor C2. Fifth transistor M5 is turned on or turned off by responding to the voltage applied to the gate electrode of fifth transistor M5.

Second capacitor C2 is connected between first node (first output terminal) N1 and the gate electrode of fifth transistor M5. Second capacitor C2 stores charges induced by voltage between the gate electrode and the first electrode of fifth transistor M5. Second capacitor C2 can be removed if necessary.

The gate electrode and the second electrode of sixth transistor M6 are connected to second power source VSS, and the first electrode of sixth transistor M6 is connected to the gate electrode of fifth transistor M5. Sixth transistor M6 is connected like a diode circuit to control the voltage of the gate electrode of fifth transistor M5.

The gate electrode of seventh transistor M7 is connected to input terminal IN, and the first electrode of seventh transistor M7 is connected to first power source VDD. The second electrode of seventh transistor M7 is connected to first node (first output terminal) N1. Seventh transistor M7 is turned on or turned off by responding to voltage supplied to input terminal IN.

Describing operation processes of the buffer shown in FIG. 3, if a high voltage is inputted to input terminal IN, seventh transistor M7 and fourth transistor M4 are turned off. At this time, the voltage of the gate electrode of fifth transistor M5 becomes approximately the voltage level of second power source VSS through sixth transistor M6, which is connected like a diode, so that fifth transistor M5 is turned on. When fifth transistor M5 is turned on, the voltage of second power source VSS is supplied to first node (first output terminal) N1.

When the voltage of second power source VSS is supplied to first node (first output terminal) N1, first transistor M1 and third transistor M3 are turned on. When first transistor M1 is turned on, the voltage of first power source VDD is supplied to second output terminal OUT. When third transistor M3 is turned on, the voltage of first power source VDD is inputted to the gate electrode of second transistor M2 so that second transistor M2 is turned off. When the second transistor M2 is turned off, the voltage of first power source VDD supplied to second output terminal OUT is maintained in a stable level.

When a low voltage is inputted to the input terminal, the seventh transistor M7 and the fourth transistor M4 are turned on. When seventh transistor M7 is turned on, the voltage of first power source VDD is supplied to first node (first output terminal) N1. At this time, since sixth transistor M6 is turned on, fifth transistor M5 is connected like a diode. In this case, the channel ratio W/L (width W over length L of a channel of a transistor) fifth transistor M5 is formed to be lower than the channel ratio W/L of seventh transistor M7 so that the voltage of first power source VDD is applied to first node (first output terminal) N1.

When first power source VDD is applied to first node (first output terminal) N1, first transistor M1 and third transistor M3 are turned off. At this time, since fourth transistor M4 is turned on, the voltage of second power source VSS is supplied to the gate electrode of second transistor M2 so that second transistor M2 is turned on. When second transistor M2 is turned on, the voltage of second power source VSS is outputted through second output terminal OUT.

In other words, the buffer of the first embodiment of the present invention outputs the voltage of first power source VDD when a high voltage is inputted to input terminal IN, and outputs the voltage of second power source VSS when a low voltage is inputted to input terminal IN. However, in the first embodiment of the present invention, when the voltage of first power source VDD is applied to first node (first output terminal) N1, leakage current is generated via fifth transistor M5, causing a problem that power consumption increases. In order to overcome this problem, a buffer of a second embodiment of the present invention as shown in FIG. 4 is proposed.

Figure 4:
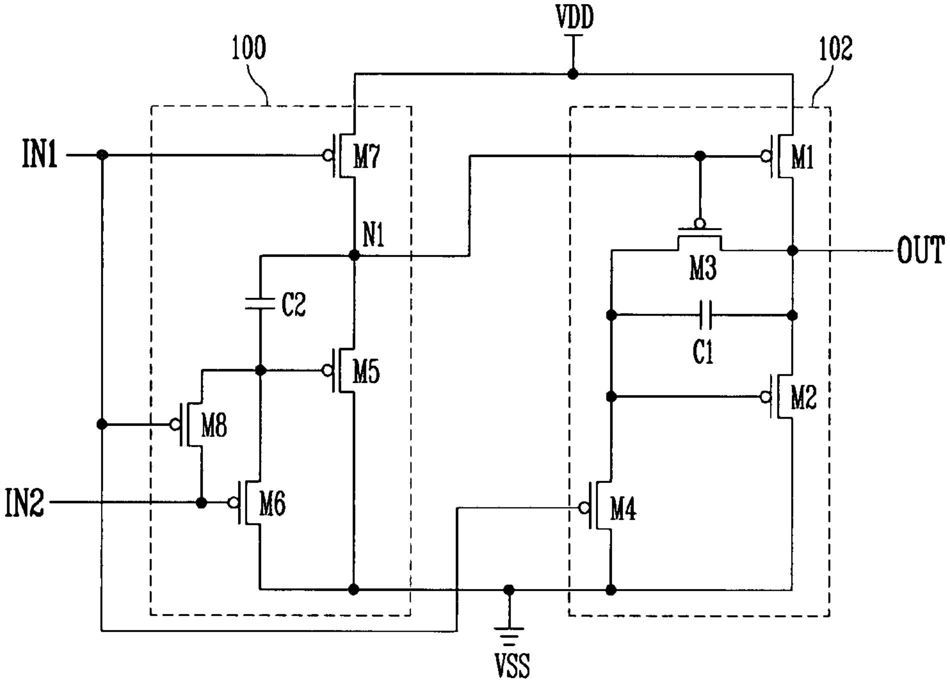
FIG. 4 is a circuit diagram showing a second embodiment of the buffer constructed as an embodiment of the present invention.

FIG. 4 is a diagram showing of a buffer constructed as a second embodiment of the present invention. In the description referring to FIG. 4, detailed descriptions of the same element as FIG. 3 will be omitted. Referring to FIG. 4, eighth transistor M8 is additionally installed in input unit 100 of the buffer of the second embodiment of the present invention.

The gate electrode of eighth transistor M8 is connected to first input terminal IN1, and the first electrode of eight transistor M8 is connected to the gate electrode of fifth transistor M5. The second electrode of eighth transistor M8 is connected to second input terminal IN2. Eighth transistor M8 controls the voltage supplied to the gate electrode of fifth transistor M5 by responding to a voltage signal supplied to first input terminal IN1.

Figure 5A:
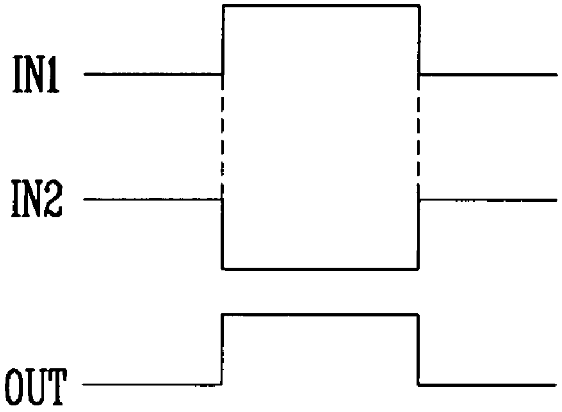
FIGS. 5*a* and 5*b* show waveforms that is used as signals to drive the buffer as shown in FIG. 4.
Figure 5B:
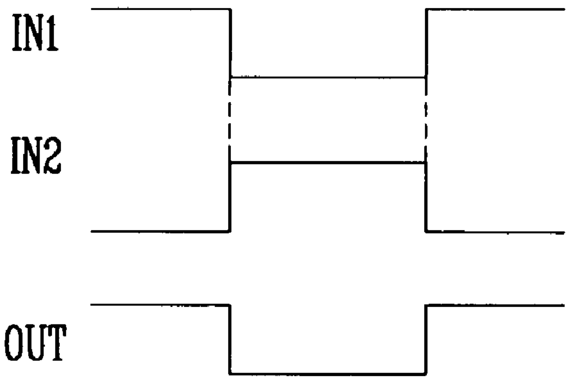

The gate electrode of the sixth transistor M6 is connected to the second input terminal IN2. Here, the second input terminal IN2 is supplied with the voltage of polarity to be opposite to the voltage supplied to the first input terminal IN1. In other words, as shown in FIGS. 5A and 5B, the first input terminal IN1 and the second input terminal IN2 are supplied with the voltage of polarity to be opposite to each other (inverted). Turning on and turning off of the transistors, however, are determined by the difference of voltages applied to a gate electrode and source electrode, but are not determined by polarities.

Describing operation processes of the buffer shown in FIG. 4, as shown in FIG. 5A, if a high voltage is inputted to first input terminal IN1, each of seventh transistor M7, eighth transistor M8, and fourth transistor M4 is turned off. Low voltage is supplied to second input terminal IN2 so that sixth transistor M6 is turned on. When sixth transistor M6 is turned on, the voltage of the gate electrode of fifth transistor M5 becomes the voltage level of second power 11 source VSS so that fifth transistor M5 is turned on. When fifth transistor M5 is turned on, the voltage of second power source VSS is supplied to first node (first output terminal) N1.

When second power source VSS is supplied to first node N1, first transistor M1 and third transistor M3 are turned on. When first transistor M1 is turned on, the voltage of first power source VDD is supplied to second output terminal OUT. When third transistor M3 is turned on, the voltage of first power source VDD is inputted to the gate electrode of second transistor M2 so that second transistor M2 is turned off. When second transistor M2 is turned off, the voltage of first power source VDD supplied to second output terminal OUT can be maintained in a stable level.

As shown in FIG. 5B, if a low voltage is inputted to first input terminal IN1, seventh transistor M7, eighth transistor M8, and fourth transistor M4 are turned on. When seventh transistor M7 is turned on, the voltage of first power source VDD is supplied to first node (first output terminal) N1. When eighth transistor M8 is turned on, the high voltage supplied to second input terminal IN2 is supplied to the gate electrode of fifth transistor M5. Sixth transistor M6 is turned off by the high voltage supplied to second input terminal IN2. Fifth transistor M5 is turned off so that leakage current does not flow from first node (first output terminal) N1 to second power source VSS.

When the voltage of first power source VDD is applied to first node (first output terminal) N1, first transistor M1 and third transistor M3 are turned off. At this time, since fourth transistor M4 is turned on, the voltage of second power source VSS is supplied to the gate electrode of second transistor M2 so that second transistor M2 is turned on. When second transistor M2 is turned on, the voltage of second power source VSS is outputted through second output terminal OUT.

In other words, the buffer of the second embodiment of the present invention outputs the voltage of first power source VDD when a high voltage is inputted to first input terminal IN1, and outputs the voltage of second power source VSS when a low voltage is inputted to first input terminal IN1. And, in the second embodiment of the present invention, when the voltage of first power source VDD is applied to first node (first output terminal) N1, fifth transistor M5 is turned off so that leakage currents are not generated, making it possible to lower the power consumption. Each of transistors M1 to M8 included in the buffer of the second embodiment of the present invention is PMOS type, and therefore it has the advantage that the buffer can be mounted on a panel.

Figure 6:
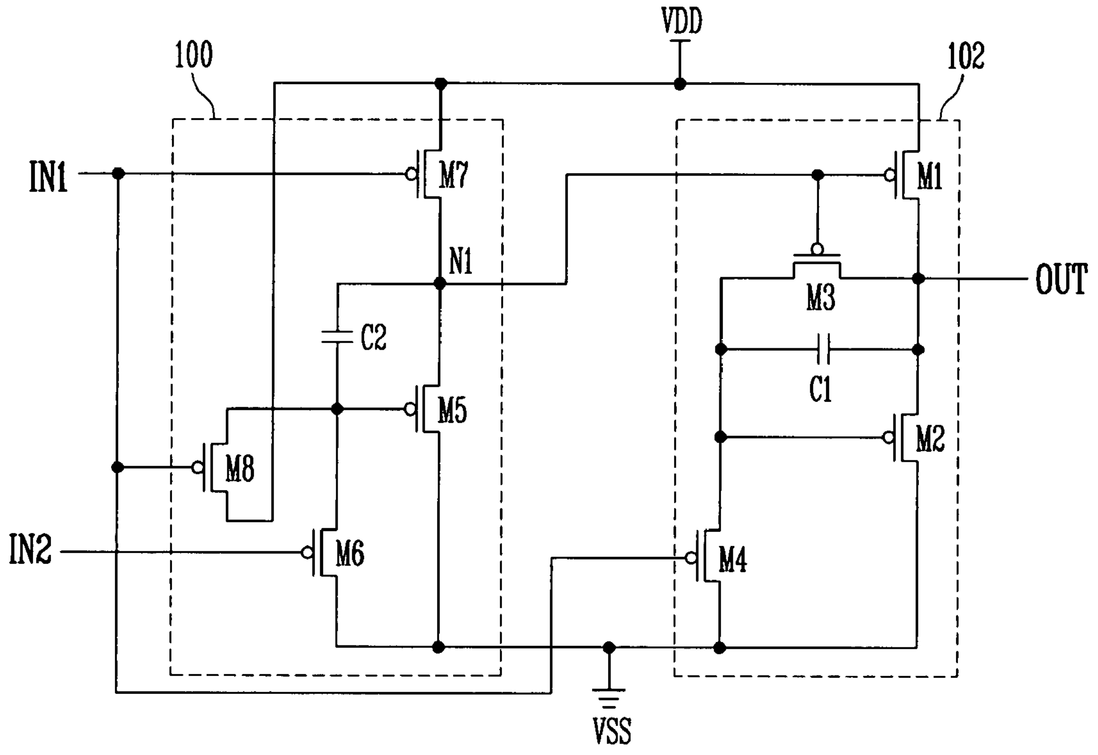
FIG. 6 is a circuit diagram showing a third embodiment of the buffer constructed as an embodiment of the present invention.

FIG. 6 is a diagram showing a buffer constructed as a third embodiment of the present invention. When describing FIG. 6, detailed descriptions of the same elements as shown in FIG. 3 will be omitted. Referring to FIG. 6, eighth transistor M8 is additionally installed in input unit 100 of the buffer of the third embodiment of the present invention, comparing with the buffer shown in FIG. 3.

The gate electrode of eighth transistor M8 is connected to first input terminal IN1, and the first electrode of eighth transistor M8 is connected to the gate electrode of fifth transistor M5. The second electrode of eighth transistor M8 is connected to first power source VDD. Eighth transistor M8 controls the voltage supplied to the gate electrode of fifth transistor M5 by responding to the voltage supplied to first input terminal IN1.

Second input terminal IN2 is supplied with a voltage that has opposite polarity to the voltage supplied to first input terminal IN1. In the third embodiment of the present invention, the gate electrode of sixth transistor M6 is connected to second input terminal IN2.

Describing operation processes of the buffer shown in FIG. 6, as shown in FIG. 5A, when a high voltage is inputted to first input terminal IN1, seventh transistor M7, eighth transistor M8, and fourth transistor M4 are turned off. A low voltage is supplied to second input terminal IN2 so that sixth transistor M6 is turned on. When sixth transistor M6 is turned on, the voltage of the gate electrode of fifth transistor M5 becomes the voltage level of second power source VSS so that fifth transistor M5 is turned on. When fifth transistor M5 is turned on, the voltage of second power source VSS is supplied to first node (first output terminal) N1.

When second power source VSS is supplied to first node N1, first transistor M1 and third transistor M3 are turned on. When first transistor M1 is turned on, the voltage of first power source VDD is supplied to second output terminal OUT. When third transistor M3 is turned on, the voltage of first power source VDD is inputted to the gate electrode of second transistor M2 so that second transistor M2 is turned off. When second transistor M2 is turned off, the voltage of first power source VDD supplied to second output terminal OUT can be maintained in a stable level.

As shown in FIG. 5B, when a low voltage is inputted to first input terminal IN1, seventh transistor M7, eighth transistor M8, and fourth transistor M4 are turned on. When seventh transistor M7 is turned on, the voltage of first power source VDD is supplied to first node (first output terminal) N1. When eighth transistor M8 is turned on, the voltage of first power source VDD is supplied to the gate electrode of fifth transistor M5. Sixth transistor M6 is turned off by the high voltage supplied to second input terminal IN2. Then, fifth transistor M5 is turned off so that leakage current does not flow from first node (first output terminal) N1 to second power source VSS.

When the voltage of first power source VDD is applied to first node (first output terminal) N1, first transistor M1 and third transistor M3 are turned off. At this time, since fourth transistor M4 is turned on, the voltage of second power source VSS is supplied to the gate electrode of second transistor M2 so that second transistor M2 is turned on. When second transistor M2 is turned on, the voltage of second power source VSS is outputted through second output terminal OUT.

In other words, the buffer of the third embodiment of the present invention outputs the voltage of first power source VDD when a high voltage is inputted to first input terminal IN1, and outputs the voltage of second power source VSS when a low voltage is inputted to first input terminal IN1. In the third embodiment of the present invention, when the voltage of first power source VDD is applied to first node (first output terminal) N1, fifth transistor M5 is turned off so that leakage current is not generated, making it possible to lower the power consumption. Each of transistors M1 to M8 included in the buffer of the third embodiment of the present invention is a PMOS type transistor, so that it has an advantage that the buffer can be mounted on a panel.

As described above, in the buffer constructed as an embodiments of the present invention, and in the organic light emitting display using the buffer, the buffer is configured of PMOS transistors so that it is mountable on a panel, making it possible to reduce the manufacturing costs thereof. Also, the present invention prevents the generation of leakage currents in the input unit, making it possible to prevent the increase of power consumption in the buffer configured of PMOS transistors.

Although a few embodiments of the present invention have been shown and described, it would be appreciated by those skilled in the art that changes might be made in this embodiment without departing from the principles and spirit of the invention, the scope of which is defined in the claims and their equivalents.

What is claimed is:

1. A buffer including:
- a first power source for supplying voltage;
- a second power source supplying lower voltage than the first power source;
- a first input terminal for supplying a voltage signal;
- a second input terminal for supplying a voltage signal, a polarity of the voltage signal of the first input terminal being opposite to a polarity of the voltage signal of the second input terminal;
- an input unit connected to each of the first power source, the second power source, the first input terminal, and the second input terminal; the input unit comprising:
  - a first output terminal for outputting voltage;
  - a seventh transistor, a first electrode of the seventh transistor connected to the first power source, a second electrode of the seventh transistor connected to the first output terminal, a gate electrode of the seventh transistor connected to the first input terminal;
  - a fifth transistor, a first electrode of the fifth transistor connected to the first output terminal, a second electrode of the fifth transistor connected to the second power source;
  - a sixth transistor, a first electrode of the sixth transistor connected to a gate electrode of the fifth transistor, a second electrode of the sixth transistor connected to the second power source, a gate electrode of the sixth transistor connected to the second input terminal; and an eighth transistor, a gate electrode of the eighth transistor connected to the first input terminal, the eighth transistor being coupled to the fifth transistor; and an output unit connected to each of the first power source, the second power source, and the first output terminal; the output unit including a second output terminal; the second output terminal outputting voltage of the first power source or voltage of the second power source.

2. The buffer as claimed in claim 1, wherein the first electrode of the eighth transistor is connected to the gate electrode of the fifth transistor, and the second electrode of the eighth transistor is connected to the second input terminal.

3. The buffer as claimed in claim 1, wherein the first electrode of the eighth transistor is connected to the gate electrode of the fifth transistor, and the second electrode of the eighth transistor is connected to the first power source.

4. The buffer as claimed in claim 1, comprised of the eighth transistor supplying a voltage to the gate electrode of the fifth transistor to turn off the fifth transistor whenever voltage of the first power source is supplied to the first output terminal.

5. The buffer as claimed in claim 1, comprised of the input unit including a second capacitor connected between the first electrode of the fifth transistor and the gate electrode of the fifth transistor.

6. The buffer as claimed in claim 1, comprised of the output unit comprising:

a first transistor, a first electrode of the first transistor connected to the first power source, a second electrode of the first transistor connected to the second output terminal, a gate electrode of the first transistor connected to the first output terminal;

a second transistor, a first electrode of the second transistor connected to the second output terminal, a second electrode of the second transistor connected to the second power source;

a third transistor, a first electrode of the third transistor connected to the first electrode of the second transistor, a second electrode of the third transistor connected to a gate electrode of the second transistor, a gate electrode of the third transistor connected to the first output terminal; and a fourth transistor, a first electrode of the fourth transistor connected the gate electrode of the second transistor, a second electrode of the fourth transistor connected to the second power source, a gate electrode of the fourth transistor connected to the first input terminal.

7. The buffer as claimed in claim 6, comprised of the output unit including a first capacitor connected between the first electrode of the second transistor and the gate electrode of the second transistor.

8. The buffer as claimed in claim 6, wherein each of the first, second, third, fourth, fifth, sixth, seventh, and eighth transistors includes a p-channel metal-oxide-semiconductor.

9. An organic light emitting display including:

a light emitting diode for generating light, the light emitting diode being connected to each of a scan line and a data line;

a scan driver connected to the scan line, the scan driver supplying a scan signal to the scan line;

a data driver connected to the data line, the data driver supplying a data signal to the data line; and a buffer included in the scan driver or in the data driver, the buffer comprising:

a first power source for supplying voltage;

a second power source supplying lower voltage than the first power source;

a first input terminal for supplying a voltage signal;

a second input terminal for supplying a voltage signal, a polarity of the voltage signal of the first input terminal being opposite to a polarity of the voltage signal of the second input terminal;

an input unit connected to each of the first power source, the second power source, the first input terminal, and the second input terminal; the input unit comprising:

a first output terminal for outputting voltage;

a seventh transistor, a first electrode of the seventh transistor connected to the first power source, a second electrode of the seventh transistor connected to the first output terminal, a gate electrode of the seventh transistor connected to the first input terminal;

a fifth transistor, a first electrode of the fifth transistor connected to the first output terminal, a second electrode of the fifth transistor connected to the second power source;

a sixth transistor, a first electrode of the sixth transistor connected to a gate electrode of the fifth transistor, a second electrode of the sixth transistor connected to the second power source, a gate electrode of the sixth transistor connected to the second input terminal; and an eighth transistor, a gate electrode of the eighth transistor connected to the first input terminal, the eighth transistor being coupled to the fifth transistor; and an output unit connected to each of the first power source, the second power source, and the first output terminal; the output unit including a second output terminal; the second output terminal outputting voltage of the first power source or voltage of the second power source.

10. The organic light emitting display as claimed in claim 9, wherein the first electrode of the eighth transistor is connected to the gate electrode of the fifth transistor, and the second electrode of the eighth transistor is connected to the second input terminal.

11. The organic light emitting display as claimed in claim 9, wherein the first electrode of the eighth transistor is connected to the gate electrode of the fifth transistor, and the second electrode of the eighth transistor is connected to the first power source.

12. The organic light emitting display as claimed in claim 9, comprised of the eighth transistor supplying a voltage to the gate electrode of the fifth transistor to turn off the fifth transistor whenever voltage of the first power source is supplied to the first output terminal.

13. The organic light emitting display as claimed in claim 9, comprised of the input unit including a second capacitor connected between the first electrode of the fifth transistor and the gate electrode of the fifth transistor.

14. The organic light emitting display as claimed in claim 9, comprised of the output unit comprising:

a first transistor, a first electrode of the first transistor of the first transistor connected to the first power source, a second electrode of the first transistor connected to the second output terminal, a gate electrode of the first transistor connected to the first output terminal;

a second transistor, a first electrode of the second transistor connected to the second output terminal, a second electrode of the second transistor connected to the second power source;

a third transistor, a first electrode of the third transistor connected to the first electrode of the second transistor, a second electrode of the third transistor connected to a gate electrode of the second transistor, a gate electrode of the third transistor connected to the first output terminal; and a fourth transistor, a first electrode of the fourth transistor connected the gate electrode of the second transistor, a second electrode of the fourth transistor connected to the second power source, a gate electrode of the fourth transistor connected to the first input terminal.

15. The organic light emitting display as claimed in claim 14, comprised of the output unit including a first capacitor connected between the first electrode of the second transistor and the gate electrode of the second transistor.

16. The organic light emitting display as claimed in claim 14, wherein each of the first, second, third, fourth, fifth, sixth, seventh, and eighth transistors includes a p-channel metal-oxide-semiconductor.

* * * * *